Patented Feb. 17, 1953

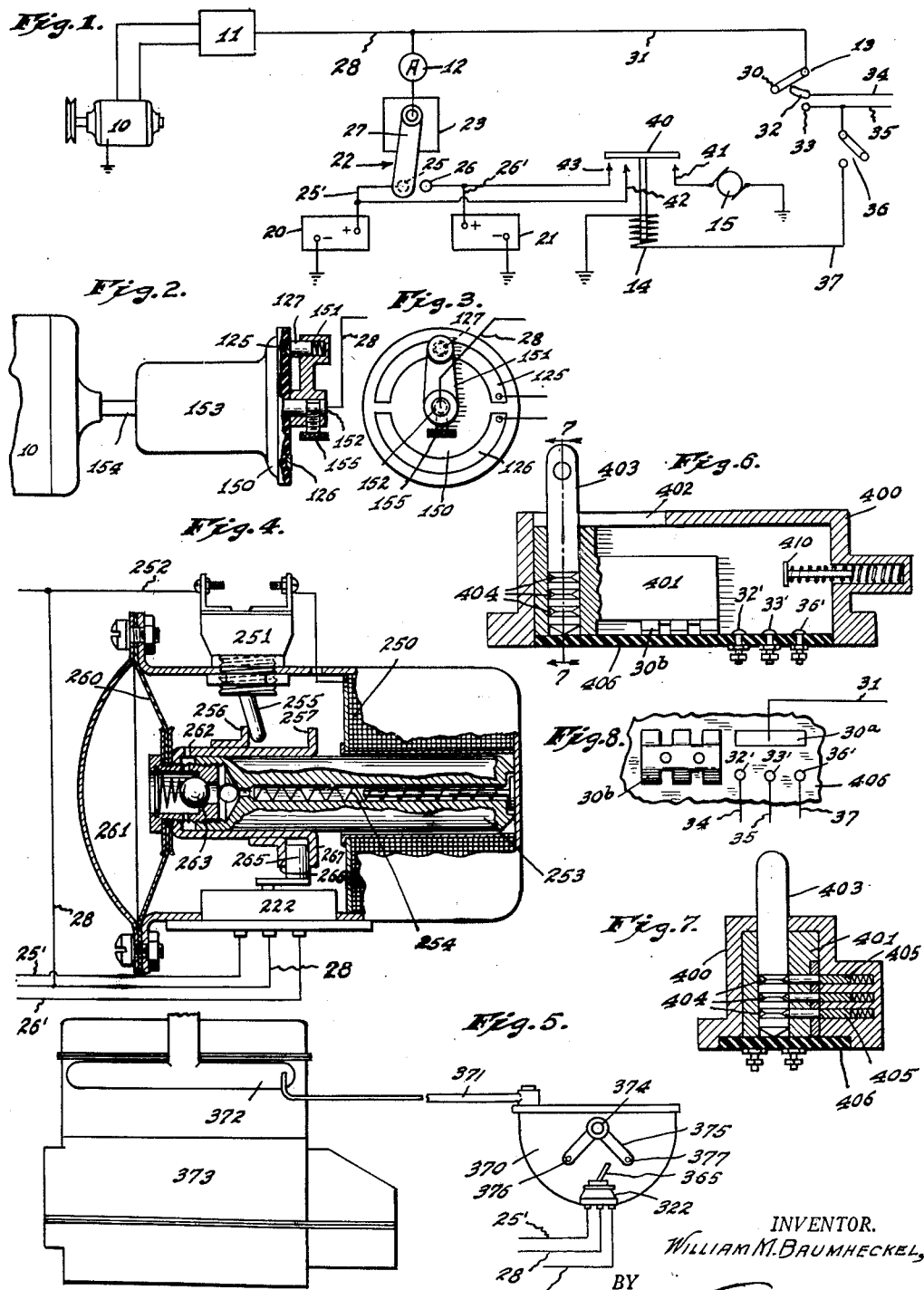

2,629,059

UNITED STATES PATENT OFFICE 2,629,059

ELECTRICAL SYSTEM FOR INTERNAL-COMBUSTION ENGINES

William M. Baumheckel, Indianapolis, Ind.

Application May 24, 1950, Serial No. 163,950

5 Claims. (Cl. 290—36)

1

The ordinary automobile or other automotive vehicle as made today commonly includes certain electrically operated apparatus, such as the ignition system of the automobile engine, the engine starter, lights, and other equipment which must be capable of functioning when the engine is not operating to generate power. To provide a source of electricity for such apparatus, it is common to employ a storage battery charged by an engine-driven generator. In order to provide a source of electrical energy more dependable and of larger capacity than the conventional storage battery, it has heretofore been proposed to employ two such batteries connected in parallel to be charged simultaneously by the engine-driven generator. Such an arrangement operates satisfactorily as long as the two batteries and the circuits which respectively contain them are in substantially the same condition; but if a condition of imbalance arises for any reason, the condition tends to become worse rather than better. For example, if one battery should begin to fail, it would receive the larger part of the current supplied to it by the generator with the result that its deterioration would be hastened, the proportion of generator current supplied to the failing battery would increase, and the better battery would be starved.

It is the object of my invention to provide a multiple-battery system in which a plurality of storage batteries are adapted to be charged by a single source of current and in which the charging of any battery will not be dependent upon the condition of the other battery or batteries or of the individual circuits respectively containing such other battery or batteries. Another object of my invention is to provide a simple and economical device which can be incorporated in association with an internal combustion engine, its generator, and a plurality of associated storage batteries and which will make it possible to maintain all the batteries charged to the limit of their individual capacities, while the total electrical energy available in all batteries is available for use.

In carrying out the invention, the several batteries are adapted for independent connection to the engine-driven generator by switching mechanism automatically operable to connect the batteries successively with the generator. The switch mechanism may be operated in any convenient manner to change the connections periodically, preferably at uniform intervals. Where, as in starting the engine, it is desired that the capacities of all batteries be simultaneously available, switch mechanism may be provided for connecting two or more of them to the current-consuming device or devices.

The accompanying drawings illustrate the invention: Fig. 1 is a diagrammatic illustration of the apparatus embodying two storage batteries adapted to be charged from a common generator and so arranged that the sum of their individual capacities will be available for use in starting an automobile engine; Fig. 2 in a side elevation in partial section and Fig. 3 is an end elevation of one form of switch and switch-operating mechanism; Fig. 4 is a sectional view illustrating another form of switch-operating mechanism; Fig. 5 illustrates a further modification of a switch operation mechanism; Fig. 6 is an elevation of a perferred form of control switch; Fig. 7 is a transverse section on the line 7—7 of Fig. 6; and Fig. 8 is a diagrammatic illustration of the contact arrangement employed in the switch of Figs. 6 and 7.

In Fig. 1, I have illustrated an electrical system which, except for the incorporation of my invention, is of a form in common use in automobiles and other automotive vehicles. The system includes an engine-driven generator 10, a combined automatic switch end voltage regulator 11, an ammeter 12, an ignition switch 13, a starter switch 14, and an engine starter 15. In incorporating my invention in such a system, I employ a plurality of storage batteries. Two such batteries, identified by the reference numerals 20 and 21, are shown in Fig. 1, although it will be understood that more batteries may be used if desired. Associated with the batteries is a selector switch 22 automatically operated by a switch-operator 23 to connect any of the batteries individually to the generator 10.

The switch 22 shown in the drawing includes stationary contacts 25 and 26 respectively connected through conductors 25' and 26' to the ungrounded terminals of the batteries 20 and 21, the other terminals of such batteries being grounded as indicated. Cooperating selectively with the contacts 25 and 26 is a movable contact 27 connected through a conductor 28 to the generator 10. The combined automatic switch end voltage regulator 11 and ammeter 12 previously referred to are connected in the conductor 28. The switch-operator 23, various forms of which will hereinafter be described, operates periodically to move the movable contact 27 out of engagement with one of the stationary contacts 25 and 26 and into engagement with the other of such contacts, whereby current from the generator 10 will be supplied alternately to the batteries 20 and 21.

The ignition switch 13 shown in Fig. 1 is of a common type in which a movable contact 30 connected to the conductor 28 through a conductor 31 may be moved from a neutral position either into engagement with a fixed contact 32 or into engagement with both the fixed contact and a second fixed contact 33. The first fixed contact 32 is adapted for connection through a conductor 34 with accessories such as a heater, radio-receiver, or windshield wiper, while the other contact 33 is adapted for connection through a conductor 35 with the ignition system of the automobile engine. The starter switch 14 shown in Fig. 1 is of the solenoid-operated type, its solenoid conveniently being connected to the contact 33 of the ignition switch 13 through a starter-control switch 36 and a conductor 37. The solenoid-operated switch 14 includes a movable bridging contact 40 adapted to interconnect three fixed contacts including a contact 41 connected to the starter motor 15, a contact 42 connected to the ungrounded terminal of the battery 20, and a contact 43 connected to the ungrounded terminal of the battery 21. When the solenoid of the switch 14 is de-energized, the bridging contact 40 is out of engagement with its associated fixed contacts; but with the ignition switch 30—33 and the starter-controlled switch 36 both closed, the solenoid will be energized to bring the bridging contact 40 into engagement with its associated fixed contacts, whereby both batteries 20 and 21 will be connected in parallel to the starter motor 15.

The movable contact 27 of the switch 22 is wide enough so that in moving from one of the fixed contacts 25 and 26 to the other it will engage the new contact before its engagement with the other is terminated, thus insuring that the conductor 31 will always be connected to at least one of the batteries 20 and 21.

Assuming that the movable contact 27 of the switch 22 is in engagement with the fixed contact 25, as shown in Fig. 1, the ungrounded terminal of the battery 20 will be connected to the conductors 28 and 31. If the generator 10 and the engine which drives it are not operating, current from the battery 20 will be available through the conductor 31 to supply the needs of any current consuming apparatus connected to such conductor. If the generator 10 is operating at a speed such that the current it produces is more than sufficient to supply the needs of any current-consuming device connected to the conductor 31, the excess current will be supplied through switch contacts 27 and 25 to the battery 20, thus charging that battery. When the switch-operator 23 moves the contact 27 into engagement with the fixed contact 26, the battery 21 is made available to supply current to the conductor 31 when the generator 10 is not operating or to receive current from the generator 10 when it is operating.

I contemplate that the switch operator 23 will function to move the movable contact 27 periodically between the fixed contacts 25 and 26. Preferably, although not necessarily, reversal of the position of the movable contact 27 is effected at equal intervals of time when the generator 10 is providing current, thus dividing the output of the generator substantially equally between the batteries 20 and 21. In most vehicles, the output of the generator 10 is more than adequate to maintain the charge on all the storage batteries employed, and hence it is possible to maintain all the batteries charged even if the generator output is not divided equally between them.

The switch and switch-operator shown in Figs. 2 and 3, comprise a pair of fixed contacts 125 and 126 respectively corresponding to the fixed contacts 25 and 26 of Fig. 1. The contacts 125 and 126 are arcuate in form and are mounted in a base 150 of insulating material. A movable contact 127, corresponding to the contact 27 of Fig. 1, is mounted at the outer end of a rotating arm 151 by which it is brought alternately into contact with the fixed contacts 125 and 126. The arm 151 may be mounted on the end of a rotating shaft 152 driven through a speed reducer 153 from the shaft 154 of the generator 10.

In the operation of the device shown in Figs. 2 and 3, the movable contact 127 is connected through the arm 151 with the conductor 28 of Fig. 1; and in the rotation of the arm 151, its movable contact 127 alternately engages the fixed contacts 125 and 126 to connect them alternately to the conductor 28. Conveniently, the arm 151 is releasably connected to the shaft 152 so that it may remain in fixed position in engagement with one of the contacts 125 and 126 while the shaft 152 continues to rotate. As shown, the shaft 152 is provided with an annular groove receiving the inner end of a clamp screw 155 mounted in the arm 151. When the screw 155 is tightened to engage the bottom of the groove in the shaft 152, the arm 151 and the shaft 152 are locked together for joint rotation, so that the movable contact 127 will alternately engage the fixed contacts 125 and 126. Upon release of the screw 155, however, the shaft 152 can turn freely in the arm 151 while the arm remains stationary with the contact 127 in engagement with one or the other of the fixed contacts 125 and 126. Where it is known that one of the batteries 20 and 21 has failed, it will be desirable to release the screw 155 and to adjust the arm 151 to bring the movable contact 127 into engagement with the fixed contact associated with the good battery.

Instead of driving the speed reducing unit 153 from the generator 10, as shown in Figs. 2 and 3, such speed-reducing unit can be otherwise driven from the engine or from some independent source of power such as a low-voltage motor having no other purpose.

The switch-operator shown in Fig. 4 is a time-delay device including a solenoid 250 adapted for connection through a switch 251 and a conductor 252 to the conductor 35 of the ignition system. Associated with the solenoid 250 is a core 253 of magnetic material biased outwardly of the solenoid by a spring 254. The switch 251 is of the snap-action type and has an operating member 255 controlled by spaced abutments 256 and 257 on the solenoid core 253 so as to be closed when the solenoid-core reaches a position of full extension under the influence of the spring 254 and to be opened when the core is retracted upon energization of the solenoid 250.

The solenoid core is operatively connected to a diaphragm 260 defining one side of an air chamber 261, the arrangement being such that the volume of the chamber 261 expands when the core 253 is retracted by energization of the solenoid and decreases as the solenoid-core advances under the influence of the spring 254. During advance of the solenoid core 253 and diaphragm 260 under the influence of the spring 254, air escapes slowly from the chamber 261 through a restricted escape port 262, the size of such port determining the rate at which the solenoid core advances. Provision is made for admitting air to the chamber 261 through a relatively unrestricted passage in which there is located a check valve 263 which opens to admit air freely to the chamber 261 when its volume is increased upon retraction of the core 253, but which closes during advance of the core 253 to force all air leaving the chamber 261 to flow through the restricted escape port 262 and thus delay the advance of the core.

Reciprocation of the solenoid core 253, in addition to operating the switch 251, operates a switch 222 which controls the connection of the generator to the batteries. The switch 222 may be of the so called ratchet type, such as is the foot-controlled switch commonly used in automobiles to control the headlight beam. As several forms of ratchet switches are well known, the switch 222 is not illustrated in detail. Such a switch may embody an oscillatable operating member 265, and contact mechanism (not shown) which effects the connection of the conductor 28 alternatively to the conductors 25' and 26'. The oscillatable control member 265 is arranged to be received between and operated by spaced abutments 266 and 267 carried on the solenoid core 253.

The parts of the device shown in Fig. 4 are illustrated in the condition existing immediately following de-energization of the solenoid 250, such de-energization having been effected by the abutment 256, which, in the rightward movement of the core, has engaged the switch-operating member 255 of the switch 251 and caused such switch to open. In the condition illustrated, the spring 254 urges the solenoid core 253 and the diaphragm 260 toward the left, displacing air from the chamber 261 through the restricted escape port 262. If the escape of air from the chamber 261 through the port 262 proceeds slowly, a considerable time interval will elapse before the solenoid core advances far enough for the abutment 257 to engage the switch-operating member 255 and close the switch 251. When such switch is closed, the solenoid is energized to draw the core to the right. Such rightward movement may proceed relatively rapidly; because the check valve 263 provides for the relatively free entrance of air into the expanding chamber 261. As the core nears the limit of its retraction, the abutment 256 engages the switch-operating member 265 and opens the switch 251, and the resultant deenergization of the solenoid 250 permits the cycle to be repeated. The duration of each cycle is obviously dependent upon the size of the escape port 262 and the characteristics of the spring 254. As the core 253 reciprocates, the control member 265 of the switch 222 is oscillated, with the result that in each cycle of core movement such switch functions to disconnect the conductor 28 from that one of the conductors 25' and 26' to which it had been connected and to connect it to the other.

As the device of Fig. 4 will be operated only when the ignition circuit is closed, it will operate only when the engine is operating and will serve as does either of the switches 22 and 122 previously described to connect the generator alternately to the two storage batteries.

The device illustrated in Fig. 5 embodies a toggle-type, single-pole double-throw switch 322 controlled by an operating member 365 to connect the conductor 28 alternately to the conductors 25' and 26'. Such switch 322 is shown as operated by a vacuum-powered motor 370, which conveniently is a standard type of windshield-wiper motor connected through a conduit 371 to the intake manifold 372 of the engine 373. The motor 370 embodies a rock shaft 374 which, when the motor is operating, oscillates through a predetermined arc. In adapting such a motor for use with my invention, there is secured to the shaft 374 a switch-acutating member 375 carrying spaced abutments 376 and 377 adapted to engage the operating member 365 of the switch 322. The rate at which the shaft 374 oscillates, and therefore the frequency at which the switch 322 is reversed, may be controlled by suitable constricting either the conduit 371 or the air-admitting openings of the motor.

As shown in Fig. 5, the shaft 374 and actuating member 375 are assumed to be moving in the clockwise direction. The abutments 376 and 377 are so positioned that as the oscillating actuating member 375 nears the end of its stroke in either direction the trailing abutment, 376 or 377, will engage the switch-operating member 365 and throw it over center to reverse the connection effected by the switch 322.

The time interval between successive operations of the selector switch 22, 122, 222, or 322, may vary widely. Too short an interval is undesirable, as the resultant frequency of operation is conducive to relatively rapid wear on moving parts. On the other hand, too great an interval is obectionable in that it might deprive one or the other of the batteries of an opportunity to be charged during a relatively short period of engine-operation. Taking these factors into consideration, I prefer that an interval of about ten minutes be required for a complete cycle of operation of the selector switch.

In selector switches of the type indicated in Fig. 2, where the movable contact moves continuously during engine operation, I prefer that it be broad enough to span the gap between the fixed contacts so that there never will be an interval in which neither battery is connected to the conductor 28; and in this way, I insure that the conductor 31 will always be connected to at least one of the batteries. Ratchet switches, such as that indicated at 222 and toggle switches, such as that shown at 322, operate with a snap action, and it is therefore unnecessary to make any specific provision for insuring against the situation in which neither battery would be connected to the conductor 31. However, even with such switches, I find it desirable to extend the contacts so that there will be some slight overlapping of the intervals in which the respective batteries are connected to the generator, as arcing is thereby avoided. Except for the very brief intervals in which the conductor 28 is connected to both batteries, charging current from the generator is supplied to but one battery at a time, and thus any lack of balance between the two batteries or between the independent circuits respectively containing them is immaterial; because, except for the brief intervals noted, the connected battery receives the full charging current.

In Figs. 6, 7, and 8 I have illustrated a preferred form of control switch shown as comprising two relatively movable members, one an elongated, open-bottomed casing 400 and the other a slide 401 longitudinally movable in such casing. The slide is provided with an opening and the casing with an elongated slot 402 for the reception of a circular key 403 having at its inner end a plurality of grooves 404 which, when the key is in place, position sectioned pins 405 to permit sliding movement of the slide 401 in the casing 400. The open bottom of the casing 400 is closed by a plate 406 of insulating material carrying a group of fixed electrical contacts the interconnection of which is effected by the slide 401. As shown, the fixed contacts comprise an elongated contact 30a connected to the conductor 31 of Fig. 1 and a parallel series of contacts 32', 33', and 36' connected respectively to the conductors 34, 35, and 37 shown in Fig. 1. A movable bridge contact 30b is embodied in the slide 401 to connect the fixed contacts progressively to the fixed contact 30a.

In the "off" position of the switch shown in Figs. 6, 7, and 8, all the bridge contacts 30b are out of engagement with the fixed contacts. If the key 403 is not in place, sections of the pins 405 will lie in both the casing 400 and slide 401, and hence will prevent movement of the slide. Upon insertion of the key, however, each section of each pin is positioned either entirely in the casing 400 or entirely in the slide 401 with the result that the slide is free to move. As the slide moves to the right, the bridge contact 30b engages the fixed contacts 30a and 32', thus connecting the conductor 34 and the accessories associated with it to a storage battery through the conductor 31 and the selector switch. As the slide 401 is moved farther, the bridge contact, while maintaining its engagement with the fixed contact 30a and 32' moves into engagement with the fixed contact 33', thus connecting both the conductors 34 and 35 to a battery. As the slide moves still further to the right, the bridge contact engages the fixed contact 36' to connect the starter-switch with the battery, while still remaining in engagement with the contacts 32' and 33' to maintain the accessories and the ignition system connected to the battery. In this third position of the slide 401, the winding of the starter switch 14 will be energized to close that switch and cause a supply of current to the starter motor and start the engine, as previously set forth.

Desirably, there is mounted in the casing 400 a spring-pressed plunger 410 which engages the slide 401 as it is moved into the third position above described and urges it to the left, so that it will be necessary for an operator to continue to apply force to the slide in order to maintain the starter-switch 14 closed. Upon release of such force, the spring-pressed plunger 410 forces the slide to the left to break the starter-switch circuit, while leaving the accessory and ignition circuits closed.

I claim as my invention:

1. In an electric system, the combination with a source of current and two storage batteries, of a current-to-battery circuit for each battery; a battery-output circuit; an electric switch for interconnecting said circuits with both of said batteries characterized by a structure simultaneously interconnecting said current-to-battery circuit selectively to either one alone of said batteries and that battery to said output circuit, and further characterized by interconnecting said current-to-battery circuit to both of said batteries in parallel and placing both of said batteries in parallel connection with said battery-output circuit prior to interrupting said current-to-battery and said battery-output circuits with said prior connected battery; and means cyclically operating said switch to switch said current-to-battery and said output circuits from one battery to the other; whereby each battery is normally alternately and separately discharged and charged without interruption of either of said circuits during the interval of switching of those circuits from one battery to the other.

2. The combination with an internal combustion engine; an engine driven generator; a generator output automatic switch and voltage regulator; two storage batteries; and a battery discharge circuit; of a switching mechanism interconnecting said generator output with either one of said batteries individually for charging and simultaneously interconnecting that output interconnected battery to said discharge circuit leaving said other battery disconnected from both said output and said circuit; said switching mechanism further having means in switching said output and said circuit from one battery to the other to have an intermediate dwell period wherein both said output and said circuit are ininterconnected with both batteries in parallel; and cycling means for operating said switching mechanism during operation of said generator.

3. The combination with an internal combustion engine; an engine driven generator; a generator output automatic switch and voltage regulator; an engine starter motor; and a plurality of storage batteries; and a battery discharge circuit; of a switching mechanism having means interconnecting said generator output with one at a time of said batteries and also interconnecting that generator-connected battery with said discharge circuit, means interconnecting said generator output with a second one alone of said batteries and said second battery to said circuit and means interconnecting said output in parallel with both of said batteries and interconnecting both of said batteries with said circuit and maintaining said parallel connections only during the period of switching over of said output and said circuit from one battery to another; and means for actuating said switching mechanism for alternate making of said interconnections in timed sequence.

4. The combination with an internal combustion engine; an engine driven generator; a generator output aromatic switch and voltage regulator; an engine starter motor; and a plurality of storage batteries; and a battery discharge circuit; of a switching mechanism having means interconnecting said generator output with one at a time of said batteries and also interconnecting that generator-connected battery with said discharge circuit, means interconnecting said generator output with a second one alone of said batteries and said second battery to said circuit and means interconnecting said output in parallel with both of said batteries and interconnecting both of said batteries with said circuit and maintaining said parallel connections only during the period of switching over of said output and said circuit from one battery to another; and means for actuating said switching mechanism for alternate making of said interconnections in timed sequence; and a starter motor control switch having means interconnecting said batteries in series with said starter motor.

5. That method of controlling charging and discharging of a plurality of storage batteries and maintaining uninterrupted current flow, which comprises the step of charging individually one of said batteries for an interval of time; charging individually a second one of said batteries for an interval of time; charging both of said batteries in parallel for an interval of time in changing the charging over from the one battery to the second battery; and discharging each battery in that interval of time only during its time of charging.

WILLIAM M. BAUMHECKEL.

REFERENCES CITED

The following references are of record in the file of this patent:

UNITED STATES PATENTS

| Number | Name | Date |
| --- | --- | --- |
| Re. 14,152 | Grob | June 20, 1916 |
| 258,149 | Stern et al. | May 16, 1882 |
| 539,500 | Biddle | Mar. 21, 1895 |
| 542,771 | Moskowitz | July 16, 1895 |
| 648,144 | Chamberlain | Apr. 24, 1900 |
| 683,444 | Cowen | Oct. 1, 1901 |
| 727,763 | Ellicott | May 12, 1903 |
| 901,423 | Cormick | Oct. 20, 1908 |
| 901,509 | Wilson | Oct. 20, 1908 |
| 1,001,358 | Crouch et al. | Aug. 22, 1911 |
| 1,090,201 | Coleman | Mar. 17, 1914 |
| 1,396,242 | Beach | Nov. 8, 1921 |
| 2,085,275 | Schmidt | June 29, 1937 |
| 2,096,378 | Mitchell | Oct. 19, 1937 |
| 2,131,026 | Doman | Sept. 27, 1938 |
| 2,131,403 | Loehr et al. | Sept. 27, 1938 |
| 2,152,405 | Dreischer | Mar. 28, 1939 |
| 2,521,969 | Dugan | Sept. 12, 1950 |
| 2,564,957 | Germak | Aug. 21, 1951 |